United States Patent [19]
Masuda et al.

[11] Patent Number: 6,050,556
[45] Date of Patent: Apr. 18, 2000

[54] FLEXURE BEARING

[75] Inventors: Hiroshi Masuda, Anjo; Nobuo Okumura, Toyota, both of Japan

[73] Assignee: Aisin Seiki Kabushiki Kaisha, Kariya, Japan

[21] Appl. No.: 09/037,611

[22] Filed: Mar. 10, 1998

[30]     Foreign Application Priority Data

Mar. 10, 1997 [JP] Japan ................................. 9-055100

[51] Int. Cl.$^7$ ...................................................... F25B 9/14
[52] U.S. Cl. ........................... 267/161; 267/160; 188/378
[58] Field of Search .................................. 188/378, 379, 188/380; 267/136, 161, 162, 160; 60/520; 403/291; 62/6

[56]             References Cited

U.S. PATENT DOCUMENTS

| 5,351,490 | 10/1994 | Ohishi et al. | 267/161 |
| 5,492,313 | 2/1996 | Pan et al. | 267/161 |
| 5,522,214 | 6/1996 | Beckett et al. | 267/161 |
| 5,895,033 | 4/1999 | Ross et al. | 267/161 |

FOREIGN PATENT DOCUMENTS 5-288419  11/1993  Japan .

*Primary Examiner*—Douglas C. Butler
*Attorney, Agent, or Firm*—Burns, Doane, Swecker & Mathis, LLP

[57]             ABSTRACT

A flexure bearing unit in a linear drive compressor that supports a piston on a yoke for reciprocating movement within a housing includes a plurality of flat discs each provided with a central opening through which extends the piston and a plurality of outer openings receiving parts of the yoke. The flexure bearing is provided with a plurality of first supports each disposed between adjacent flat discs at the outer peripheral portions of the flat discs for supporting opposite sides of the flat discs at the outer peripheral portions of the flat discs. The flexure bearing is also provided with a plurality of second supports each provided between adjacent flat discs at the inner peripheral portions of the flat discs for supporting opposite sides of the flat discs at the inner peripheral portions of the flat discs. The flat discs each include a plurality of spirally extending slits which each possess oppositely located ends. One end of each slit terminates in the outer peripheral portion of the flat disc that is supported on opposite sides by the first supports and the other end of each slit terminates in the inner peripheral portion of the flat disc that is supported on opposite sides by the second supports.

18 Claims, 4 Drawing Sheets

FLEXURE BEARING

This application corresponds to and claims priority under 35 U.S.C. §119 with respect to Japanese Application No. 09(1997)-55100, the entire content of which are incorporated herein by reference.

FIELD OF THE INVENTION

The present invention generally relates to a bearing. More particularly, the present invention pertains to a flexure bearing for use in a linear drive compressor to support a piston without frictional contact with a cylindrical space formed in a housing.

BACKGROUND OF THE INVENTION

In a conventional linear drive compressor, a piston is adapted to be moved in a reciprocating movement in a cylindrical portion of a housing. The piston is supported by flexure bearings for avoiding sliding engagement of the piston with the cylindrical portion of the housing. The reason for this structure is that the sliding engagement causes contamination of the coolant gas and deterioration of the seal ring that is mounted on the piston, problems that inevitably lower the performance of the compressor.

Japanese Patent Laid-Open Publication No. Hei 5-288419, published without examination on Nov. 2, 1993, discloses a flexure bearing for use in a linear drive compressor. This flexure bearing, which is illustrated in FIG. 4 of the present application, consists of a flat disc which is formed with a plurality of spirally arranged slits $19d$. The outer periphery $19a1$ of the flat disc $19a$ of the flexure bearing $19$ is supported within the housing and the inner periphery $19a2$ of the flat disc $19a$ of the flexure bearing $19$ is connected to the piston. With the piston supported in this manner, the flexure bearing $19$ is very rigid in the radial direction and very flexible in the axial direction. Thus, the flexure bearing $19$ is able to provide a non-contacting and no-wear relationship between the piston and the cylindrical portion of the housing while the piston is moving in a reciprocating manner.

However, when the stroke of the piston is increased for achieving greater power or performance of the linear drive compressor, and/or when the diameter of the flexure bearing is reduced for obtaining a lighter linear drive compressor, stress concentrations appear at opposite extreme ends of each slit and this can cause cracks to occur or tearing-off at the ends. It has been found that these problems cannot be addressed by a mere modification of the flexure bearing.

A need thus exists for a flexure bearing which is not susceptible of the same disadvantages and drawbacks discussed above.

It would thus be desirable to provide a flexure bearing which is not susceptible to crack formation or tearing-off at the extreme ends of the slits formed in the flat disc of the bearing.

SUMMARY OF THE INVENTION

In light of the foregoing, the present invention provides a flexure bearing unit for a linear drive compressor that supports a piston on a yoke for reciprocating movement within a housing, wherein the flexure bearing unit includes a plurality of flat discs each provided with a central opening through which extends the piston and a plurality of outer openings receiving parts of the yoke. The flexure bearing is provided with a plurality of first supports each disposed between adjacent flat discs at the outer peripheral portions of the flat discs for supporting opposite sides of the flat discs at the outer peripheral portions of the flat discs. The flexure bearing is also provided with a plurality of second supports each provided between adjacent flat discs at the inner peripheral portions of the flat discs for supporting opposite sides of the flat discs at the inner peripheral portions of the flat discs. The flat discs each include a plurality of spirally extending slits which each possess oppositely located ends. One end of each slit terminates in the outer peripheral portion of the flat disc that is supported on opposite sides by the first supports and the other end of each slit terminates in the inner peripheral portion of the flat disc that is supported on opposite sides by the second supports.

According to another aspect of the invention, a flexure bearing unit for a linear drive compressor that supports a piston on a yoke for reciprocating movement within a housing includes at least one flat disc provided with a central opening through which extends the piston and a plurality of outer openings receiving parts of the yoke, and a pair of supports provided on opposite sides of the flat disc at the outer peripheral portion of the flat disc for supporting the opposite sides of the flat disc at the outer peripheral portion of the flat disc. The flat disc includes at least one spirally extending slit which possesses oppositely located ends, with one end of the slit terminating in the outer peripheral portion of the flat disc that is supported on opposite sides by the pair of supports and with the other end of the slit terminating in the inner peripheral portion of the flat disc.

In accordance with another aspect of the present invention, a flexure bearing unit for a linear drive compressor that supports a piston on a yoke for reciprocating movement within a housing includes at least one flat disc provided with a central opening through which extends the piston and a plurality of outer openings receiving parts of the yoke. A pair of supports is provided and are disposed on opposite sides of the flat disc at the inner peripheral portion of the flat disc for supporting the opposite sides of the flat disc at the inner peripheral portion of the flat disc. The flat disc includes at least one spirally extending slit which possesses oppositely located ends, with one end of the slit terminating in the outer peripheral portion of the flat disc and the other end of the slit terminating in the inner peripheral portion of the flat disc that is supported on opposite sides by the pair of supports.

BRIEF DESCRIPTION OF THE DRAWING FIGURES

The above and additional features and characteristics of the present invention will become more apparent from the following detailed description considered with reference to the accompanying drawing figures in which like elements bear like reference numerals and wherein.

DETAILED DESCRIPTION OF THE PRESENT INVENTION

Figure 1:
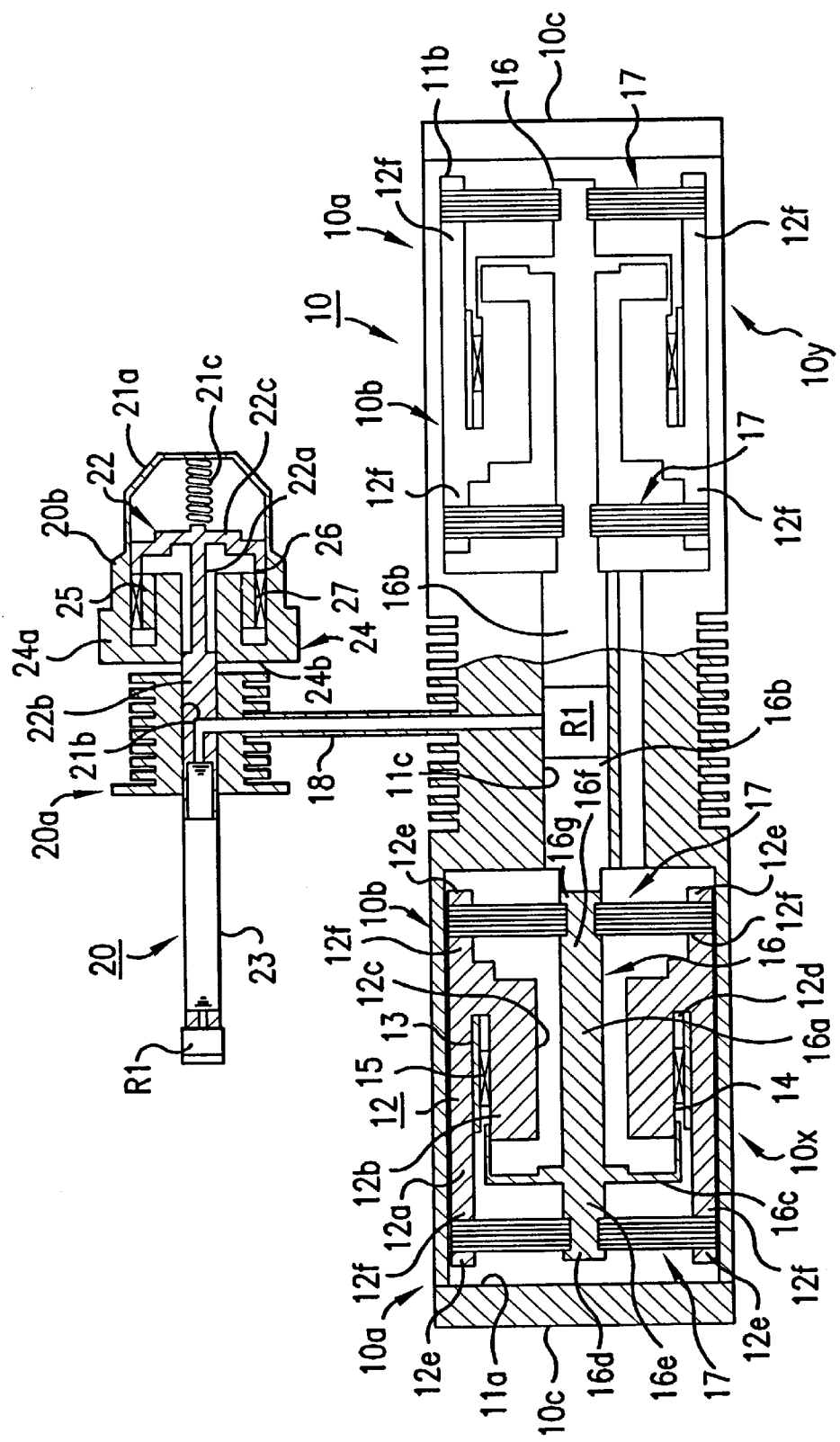
FIG. 1 is a cross-sectional view of the overall construction of a Stirling engine cooler having a linear drive compressor.

Referring initially to FIG. 1, a split type Stirling engine cooler has a linear drive compressor $10$ connected to a displacer or expanding device 20. The linear drive compressor 10 includes a pair of head-to-head arranged compressor assemblies 10X and 10Y. The compressor 10 also includes a housing 10a in which are defined a left side chamber 11a and a right chamber 11b. The opposite ends of the housing 10a are preferably provided with removable ends 10c for permitting access to the interior of the housing so that the compressor assemblies 10X and 10Y can be installed.

An intermediate chamber or cylindrical portion 11c is formed in the housing 10a between the left side chamber 11a and the right side chamber 11b. This intermediate chamber 11c is in fluid communication with both the left side chamber 11a and the right side chamber 11b.

A linear motor 10b associated with the compressor assembly 10X is accommodated in both the left side chamber 11a and the right side chamber 11b. The linear motor 10b includes a yoke 12 fitted in the left side chamber 10a, a magnet 13, a bobbin 14, and a coil 15. A piston 16 is supported in the housing 10a by the yoke 12 through a pair of axially spaced flexure bearing units 17.

The yoke 12 includes an outer sleeve 12a and an inner sleeve 12b, with an annular gap 12d being defined between the two sleeves 12a, 12b. The opposite ends of the outer sleeve 12a are provided with a plurality of axially extending projections 12e each having a free end portion that is slightly enlarged. For reasons that will become more apparent from the description below, the enlarged free end portions of the projections 12e are preferably removable. The magnet 13 is fitted in the outer sleeve 12a, while the bobbin 14 on which the coil 15 is wound is located between the magnet 13 and the inner sleeve 12b. As described below in more detail, the bobbin 14 is adapted to be moved together with the piston 16.

The piston 16 includes a first portion 16a of relatively smaller outer diameter and a second portion 16b of relatively larger outer diameter. The first portion 16a extends axially from the second portion 16b in the leftward direction as seen with reference to FIG. 1. Near the distal end of the first portion 16a, a flange portion 16c is integrally formed with the first portion 16a. The flange portion 16c is formed such that immediately adjacent the piston the flange portion 16c extends radially outwardly and is then bent through an angle of about 90 degrees to extend axially away from the first portion 16a (i.e., towards the right) as seen in FIG. 1. The distal end of the flange portion 12c is coupled to the bobbin 14 and so the bobbin 14 is movable together with the piston 16.

The first portion 16a of the piston 16 passes through an axially extending opening 12c formed in the inner sleeve 12b of the yoke 12, while the second portion 16b of the piston 16 is slidably fitted in the intermediate chamber 11c. The distal end and the proximal end of the first portion 16a of the piston 16 are both supported by the outer sleeve 12a of the yoke 12 by way of respective flexure bearing units 17.

Figure 2:
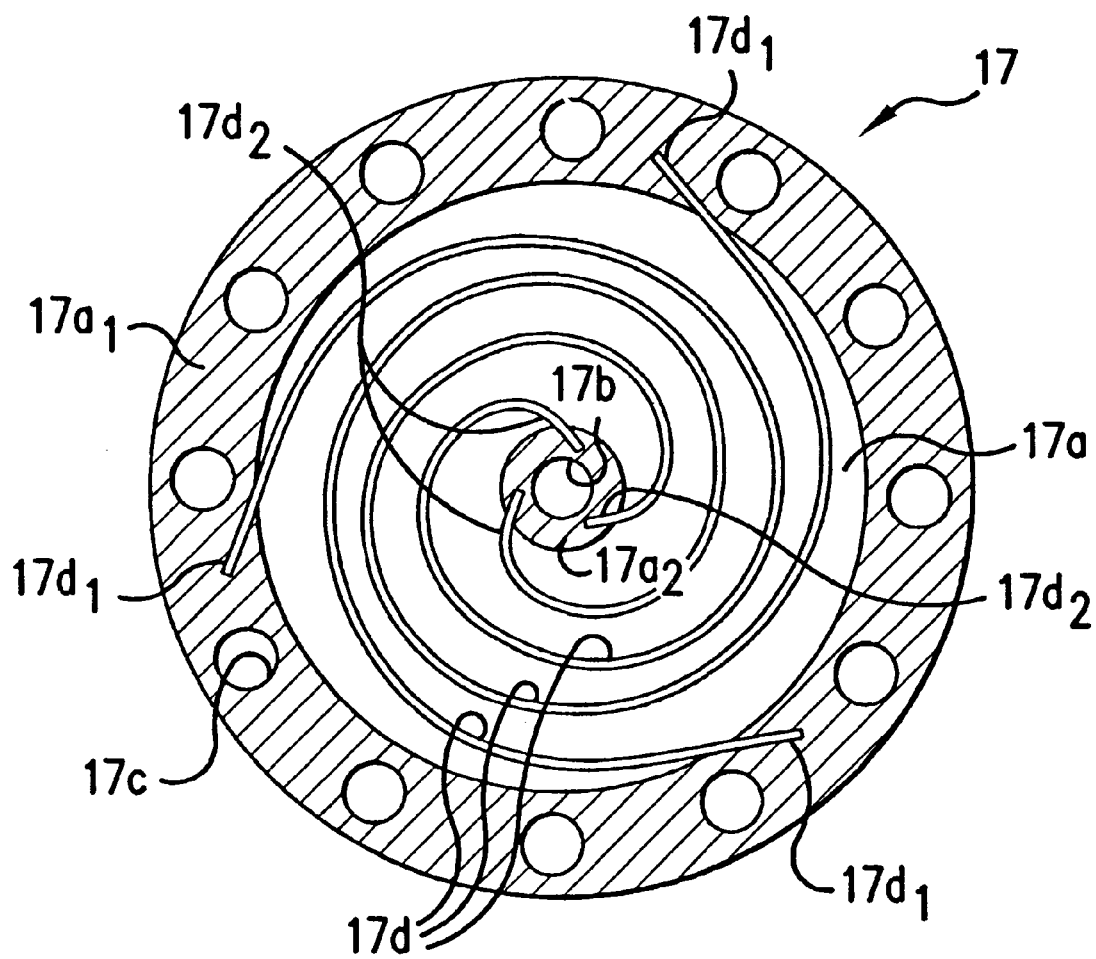
FIG. 2 is a plan view of the flat disc constituting a part of the flexure bearing in accordance with the present invention.

As seen with reference to FIG. 2, each flexure bearing unit 17 includes a plurality of axially spaced flat discs 17a. Each flat disc 17a has an outer peripheral portion 17a1 along which are formed a plurality of outer through holes 17c equally spaced apart in a circumferential manner about the flat disc 17a. In the illustrated embodiment, twelve outer holes 17c are provided. The outer through holes 17c each receive a respective one of the projections 12e of the yoke 12 as shown in FIG. 1. The flat discs 17a forming each flexure bearing unit are thus mounted at the opposite ends of the outer sleeve 12a of the yoke 12.

Figure 3:
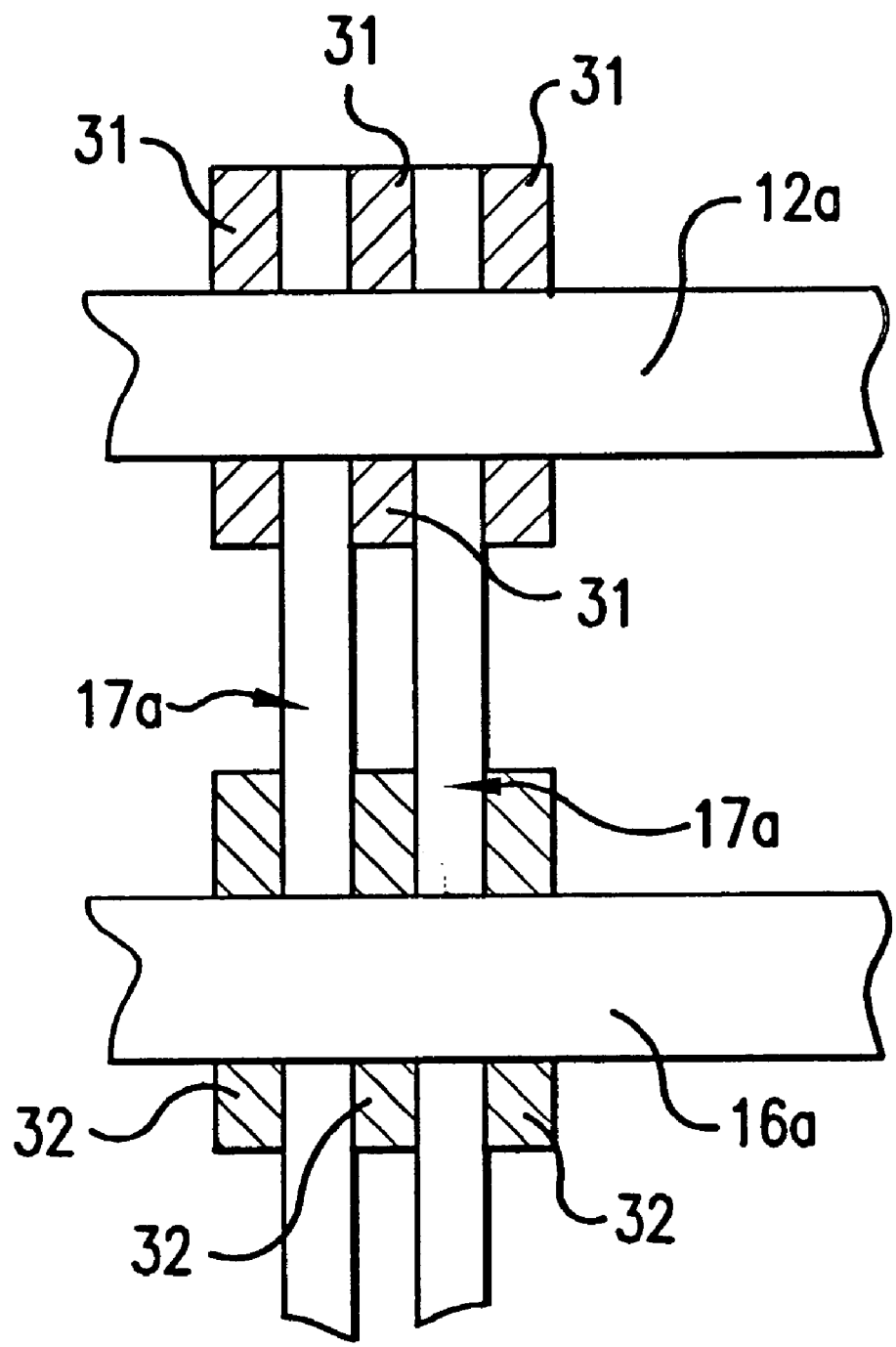
FIG. 3 is a side view of a portion of a flexure bearing in accordance with the present invention illustrating the way in which the flat discs and supports are mounted on the yoke and the piston.
Figure 4:
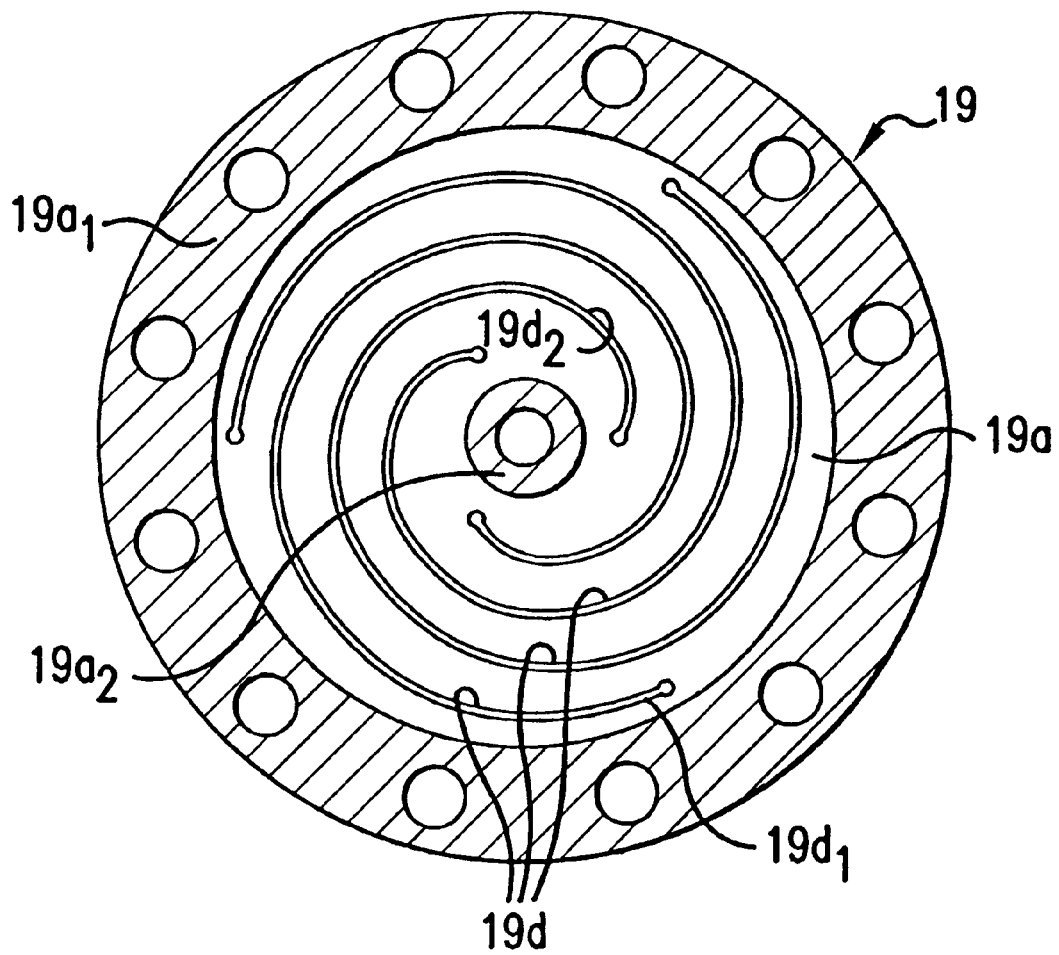
FIG. 4 is a cross-sectional view of a known flexure bearing.

As seen with reference to FIG. 3, each of the flexure bearing units 17 also includes a plurality of annular first spacers or supports 31, with each first spacer 31 being disposed between adjacent pairs of flat discs 17a. The first spacers 31 are positioned between adjacent flat discs 17a at the outer peripheral portions 17a1 of the flat discs 17a. The first spacers 31 serve as supports so that adjacent pairs of the spacers hold and support opposite sides of one of the flat discs 17a. The annular spacers 31 are provided with a plurality of spaced apart through holes that coincide with the holes 17c in the flat disc 17a and with the projections 12e on the yoke 12. The spacers 31 preferably have an outer diameter that is the same as the outer diameter of the flat discs 17a.

By virtue of the spacers or supports 31, the radially outwardly located outer peripheral portion 17a1 of each flat disc 17a is supported on opposite sides by the supports 31. It is to be noted with reference to FIG. 1 that the portion 12f of the yoke 12 from which the projections 12e extend can be slightly enlarged to form an abutment 12f which thus provides a support on one side for the outer peripheral portion of the immediately adjacent flat disc 17a. Thus, in the case of the flexure bearing units 17 of the compressor assembly 10X, the flat disc 17a located immediately adjacent the enlarged abutment 12f of the yoke is supported on one side by the enlarged abutment 12f of the yoke 12 and on the other side by one of the annular spacers or supports 31.

As described above, the free end portions of the projections 12e are enlarged and removable. The enlarged nature of the free end portions of the projections 12e form an abutment that provides a support on one side for the outer peripheral portion of the immediately adjacent flat disc 17a. Thus, in the case of the flexure bearing units 17 of the compressor assembly 10X, the flat disc 17a located immediately adjacent the enlarged free end portions of the projections 12e is supported on one side by the enlarged free end portion of the projections 12e of the yoke 12 and on the other side by one of the annular spacers or supports 31. The enlarged free end portions of the projections 12e are made removable to allow the flat discs 17a and spacers 31 to be positioned on the projections 12e of the yoke 12 in the manner shown in FIG. 1.

As seen further with reference to FIG. 2, each flat disc 17a also has a centrally located through opening 17b in which is firmly fitted the first portion 16a of the piston 16. The flat disc 17a has an inner peripheral portion 17a2 surrounding the central opening 17b.

Each flexure bearing unit 17 also includes a plurality of annular second spacers or supports 32 which are depicted in FIG. 3. Each second spacer 32 includes a centrally located through hole that coincides with the central through hole 17b in the flat discs 17a. The second spacers 32 are each positioned between adjacent pairs of flat discs 17a at the inner peripheral portions 17a2 of the flat discs 17a. Thus, the radially inwardly located inner peripheral portion 17a2 of each flat disc 17a is supported on opposite sides. The thickness of the second spacers 32 located at the inner peripheral portions 17a2 of the flat discs 17a is identical to the thickness of the first spacers 31 disposed at the outer peripheral portions 17a1 of the flat discs 17a.

It is to be noted with reference to FIG. 1 that the piston 16 is provided with enlarged portions 16e, 16f. In addition, the distal end 16d of the piston 16 is enlarged as is a portion 16g of the piston adjacent the second portion 16b of the piston 16. These enlarged portions 16d, 16e, 16f, 16g of the piston 16 define abutments for the immediately adjacent flat discs 17a that support the inner peripheral portions of the flat discs 17a on one side. Thus, in the case of the flexure bearing units 17 of the compressor assembly 10X, the flat disc 17a located immediately adjacent the enlarged distal end portion 16d of the piston 16 is supported on one side by the enlarged distal end portion 16d of the piston 16 and on the other side by one of the second spacers or supports 32. The flat disc 17a located immediately adjacent the enlarged portion 16e of the piston 16 is supported on one side by the enlarged portion 16e of the piston 16 and on the other side by one of the second spacers or supports 32. Similarly, the flat disc 17a located immediately adjacent the enlarged portion 16f of the piston 16 is supported on one side by the enlarged portion 16f of the piston 16 and on the other side by one of the second spacers or supports 32. Finally, the flat disc 17a located immediately adjacent the enlarged portion 16g of the piston 16 is supported on one side by the enlarged portion 16g of the piston 16 and on the other side by one of the second spacers or supports 32.

It is also to be understood that the enlarged distal end portion 16d of the piston 16 can be made removable to allow the flat discs 17a and the second spacers 32 to be positioned on the piston 16 in the manner shown in FIG. 1. Also, to permit the flat discs 17a and second spacers 32 located closest to the second portion 16b of the piston 16 to be mounted on the piston 16, the piston 16 is formed in two pieces, with the connection between the two pieces being provided to the left of the enlarged portion 16g of the piston 16. The connection between the two pieces can be effected in any desired manner.

FIG. 2 illustrates one of the flat plates 17a forming the flexure bearing unit of the present invention. The hatching shown in FIG. 2 is intended to identify the portion of the flat plate constituting the outer peripheral portion 17a1 of the flat disc 17 (i.e., the portion of the flat disc 17a supported by the first spacers 31 and the enlarged portions of the yoke 12) and the portion of the flat disc 17 constituting the inner peripheral portion 17a2 of the flat disc 17a (i.e., the portion of the flat disc 17a supported by the second spacers 32 and the enlarged portions of the piston 16).

As shown in FIG. 2, each flat disc 17a is provided with three separate and independent slits 17d. The slits 17d include a distal end 17d1 and a proximal end 17d2, with the slits 17d extending in a spiral manner from the distal end 17d1 to the proximal end 17d2.

As can be seen from FIG. 2, the distal end 17d1 of each spiral slit 17d extends into the outer peripheral portion 17a1 of the flat disc 17a. That is, the distal end 17d1 of each spiral slit 17d extends into the portion of the flat disc 17a that is held or supported by the first spacers or supports 31 (and the enlarged portions of the yoke 12). Also, the distal end of each slit 17d terminates between a pair of adjacent outer holes 17c in the flat disc 17a.

As can be further seen from FIG. 2, the proximal end 17d2 of each spiral slit 17d extends into the inner peripheral portion 17a2 of the flat disc 17a. That is, the proximal end 17d2 of each spiral slit 17d extends into the portion of the flat disc 17a supported by the second spacers or supports 32 (and the enlarged portions of the piston 16).

Thus, the distal end 17d1 of each slit 17d and the portion of the slit adjoining the distal end 17d1 of each slit 17d is held and sandwiched between the supports positioned on either side of the outer peripheral portion of the flat disc 17 (i.e, a pair of first spacers 31 or one of the spacers 31 and the enlarged portion of the yoke 12). Similarly, the proximal end 17d2 of each slit 17d and the portion of the slit adjoining the proximal end 17d2 of each slit 17d is held and sandwiched between the supports positioned on either side of the inner peripheral portion of the flat disc 17 (i.e, a pair of second spacers 32 or one of the spacers 32 and an enlarged portion of the piston 16). Because the outer and inner peripheral portions 17a1, 17a2 of the flat discs 17a, and thus the distal and proximal ends 17d1, 17d2 of the slits 17d are supported or held between supports in this manner, deformation of the flat disc 17 resulting from movement of the piston 16 is advantageously prevented from being transmitted to the distal end 17d1 and the proximal end 17d2 of the slits, and the neighboring regions.

The description above relates to the compressor assembly that is accommodated within the left side chamber 11a of the housing 10a. As described above, the compressor assembly 10Y is accommodated within the right side chamber 11b of the housing 10a. The compressor assembly 10Y possesses a structure similar to and symmetrical with respect to the compressor assembly 10X described above. Thus, a detailed explanation of such structure is omitted.

With reference once again to FIG. 1, a compression chamber R1 is defined within the intermediate chamber or cylindrical portion 11c of the housing 10a. The compression chamber R1 is defined between the two second portions 16b, 16b of the piston 16. The compressor assemblies 10X, 10Y are set to be in in-phase operation and therefore provide for inherent momentum cancellation and minimal vibration output.

When an alternating current flows in the coil 15, the two linear motors 10b, 10b bring the compressor assemblies 10X, 10Y into operation. During driving movement of each of the linear motors 10b, 10b, the piston 16 supported by the flexure bearing units 17 is moved in a reciprocating manner while maintaining a radial clearance between the second portions 16b of the pistons 16 and the cylindrical portion 11c of the housing 10a. It is to be noted that the flat discs 17a forming a principal element of the flexure bearing units 17 possess considerable radial stiffness. This ensures that the piston 16 moves in a precise linear manner, even in the presence of large radial forces.

The expanding device 20 is separated or isolated from the compressor 10, with the two being connected to each other only by way of a conduit 18 extending from the compression chamber R1 to the expanding device 20. The expanding device 20 includes a housing 20a in which is disposed a linear motor 20b. The housing 20a includes a chamber 21a in which are accommodated a piston 22 and a compression spring 21c. The housing 20a also includes a cylindrical portion 21b. The piston 22 includes an axial portion 22a, an enlarged head portion 22b extending from one end of the axial portion 22a, and a flange portion 22c extending from the opposite end of the axial portion 22a.

A built-in regenerator 23 is provided at one end of the head portion 22b of the piston 22. When the axial portion 22a of the piston 22 is located in the cylindrical portion 21b of the housing 20a and the flange portion 22c is located in the chamber 21c, the regenerator 23 is adapted to project from the housing 20a.

The linear motor 20b includes a yoke 24, a magnet 25, a bobbin 26 and a coil 27. The yoke 24 is formed integrally with the housing 20a and has an outer sleeve 24a and an inner sleeve 24b. The outer sleeve 24a and the inner sleeve 24b are concentrically arranged. The magnet 25 is fixedly mounted on the outer periphery of the inner sleeve 24b. The coil 27 is wound on the bobbin 26, and the bobbin 26 is secured to one end of the flange portion 22c. The coil 27 is located between the outer sleeve 24a of the yoke 24 and the magnet 25 with a clearance being provided.

The linear motor 20b is adapted to move the piston 22 of the expanding device 20. A cold or very low temperature is produced in a expanding chamber R2 formed near the regenerator 23 in the distal end of the expanding device 20. This cold or very low temperature is used to cool a substance such as an infrared element (not shown) on the distal end of the expanding device 20. The regenerator 23 operates to temporarily store or reserve a low temperature while a low temperature gas or coolant is being fed from the expanding chamber R2 toward the compression chamber R1, and operates to pre-cool a hot temperature gas flowing into the expanding chamber R2 from the compression chamber R1.

By virtue of the present invention, the flat discs 17a forming the flexure bearing units 17 are designed in a way that inhibits stress concentrations at the opposite ends of the spiral slits 17d (i.e., at the distal end 17d1 and the proximal end 17d2). The extreme ends of each slit 17d (i.e., the distal end 17d1 and the proximal end 17d2) are firmly held between the supports (i.e., between a pair of first spacers 31 and a pair of second spacers 32, or between one first spacer 31 and an enlarged portion of the yoke 12 and between one second spacer 32 and an enlarged portion of the piston 16) and so potentially damaging stress concentrations do not arise. Thus, even when a very high radial force is applied to the flat discs 17a, cracks do not form at the extreme ends of the slits 17d (i.e., the distal end 17d1 and the proximal end 17d2) and the ends do not become torn off.

It is to be understood that an extension of one of the extreme ends of the slits into the corresponding peripheral portion of the flat disc (i.e., the inner or outer peripheral portions of the flat disc) can be omitted if the rating or design performance of the linear drive cooler so permits.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A flexure bearing unit in a linear drive compressor that supports a piston on a yoke for reciprocating movement within a housing, the flexure bearing unit comprising:
   a plurality of flat discs each provided with a central opening through which extends the piston and a plurality of outer openings receiving parts of the yoke, the flat discs each having an inner peripheral portion surrounding the central opening and an outer peripheral portion;
   a plurality of first supports each provided between adjacent flat discs at the outer peripheral portions of the flat discs for supporting opposite sides of the flat discs at the outer peripheral portions of the flat discs;
   a plurality of second supports each provided between adjacent flat discs at the inner peripheral portions of the flat discs for supporting opposite sides of the flat discs at the inner peripheral portions of the flat discs; and
   the flat discs each including a plurality of spirally extending slits which each possess oppositely located ends, one end of each slit terminating in the outer peripheral portion of the flat disc that is held and sandwiched between the first supports, the other end of each slit terminating in the inner peripheral portion of the flat disc that is held and sandwiched between the second supports.

2. The flexure bearing unit according to claim 1, wherein the one end of each slit in each flat disc is positioned between two of the outer openings in the flat disc.

3. The flexure bearing unit according to claim 1, wherein the second spacers are annular elements that encircle the piston.

4. The flexure bearing unit according to claim 1, wherein the first spacers are annular elements provided with a plurality of holes corresponding in location to said outer holes.

5. The flexure bearing unit according to claim 1, wherein the linear drive compressor is an element of a Stirling cooler.

6. The flexure bearing unit according to claim 1, wherein the first supports include spacers.

7. The flexure bearing unit according to claim 1, wherein the first supports include an enlarged portion of the yoke.

8. The flexure bearing unit according to claim 1, wherein the second supports include spacers.

9. The flexure bearing unit according to claim 1, wherein the second supports include an enlarged portion of the piston.

10. A flexure bearing unit in a linear drive compressor that supports a piston on a yoke for reciprocating movement within a housing, the flexure bearing unit comprising:
    at least one flat disc provided with a central opening through which extends the piston and a plurality of outer openings receiving parts of the yoke, the flat disc possessing an inner peripheral portion surrounding the central opening and an outer peripheral portion;
    a pair of supports provided on opposite sides of the flat disc at the outer peripheral portion of the flat disc for supporting the opposite sides of the flat disc at the outer peripheral portion of the flat disc; and
    the flat disc including at least one spirally extending slit which possesses oppositely located ends, one end of the slit terminating in the outer peripheral portion of the flat disc that is held and sandwiched between the pair of supports, the other end of the slit terminating in the inner peripheral portion of the flat disc.

11. The flexure bearing unit according to claim 10, including a plurality of flat discs and a plurality of supports, the outer peripheral portion of each flat disc being supported on opposite sides by one of the supports.

12. The flexure bearing unit according to claim 10, wherein said pair of supports is a pair of first supports, and including a pair of second supports provided on opposite sides of the flat disc at the inner peripheral portion of the flat disc for supporting the opposite sides of the flat disc at the inner peripheral portion of the flat disc.

13. The flexure bearing unit according to claim 10, wherein the supports include spacers.

14. The flexure bearing unit according to claim 10, wherein the supports include an enlarged portion of the yoke.

15. A flexure bearing unit in a linear drive compressor that supports a piston on a yoke for reciprocating movement within a housing, the flexure bearing unit comprising:
    at least one flat disc provided with a central opening through which extends the piston and a plurality of outer openings receiving parts of the yoke, the flat disc possessing an inner peripheral portion surrounding the central opening and an outer peripheral portion;
    a pair of supports provided on opposite sides of the flat disc at the inner peripheral portion of the flat disc for supporting the opposite sides of the flat disc at the inner peripheral portion of the flat disc; and the flat disc including at least one spirally extending slit which possesses oppositely located ends, one end of the slit terminating in the outer peripheral portion of the flat disc, the other end of the slit terminating in the inner peripheral portion of the flat disc that is held sandwiched between the pair of supports.

16. The flexure bearing unit according to claim 15, including a plurality of flat discs and a plurality of supports, the outer peripheral portion of each flat disc being supported on opposite sides by one of the supports.

17. The flexure bearing unit according to claim 15, wherein the supports include spacers.

18. The flexure bearing unit according to claim 15, wherein the supports include an enlarged portion of the piston.

* * * * *